United States Patent (10) Patent No.: US 8,260,306 B2
Lee et al. (45) Date of Patent: Sep. 4, 2012

(54) APPARATUS AND METHOD OF DETERMINING MOBILITY STATE IN WIRELESS COMMUNICATION SYSTEM

(75) Inventors: Sung Min Lee, Anyang-si (KR); Sung Jun Park, Anyang-si (KR); Sung Hoon Jung, Anyang-si (KR); Sung Duck Chun, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 190 days.

(21) Appl. No.: 12/843,401

(22) Filed: Jul. 26, 2010

(65) Prior Publication Data

US 2011/0021201 A1 Jan. 27, 2011

Related U.S. Application Data

(60) Provisional application No. 61/228,949, filed on Jul. 27, 2009, provisional application No. 61/233,806, filed on Aug. 13, 2009.

(30) Foreign Application Priority Data

Jul. 22, 2010 (KR) .................. 10-2010-0070908

(51) Int. Cl.
*H04W 36/00* (2009.01)
(52) U.S. Cl. ........ 455/444; 455/436; 455/443; 370/331; 370/328; 370/338
(58) Field of Classification Search .......... None
See application file for complete search history.

(56) References Cited

U.S. PATENT DOCUMENTS

| 6,256,500 | B1 * | 7/2001 | Yamashita | 455/441 |
|---|---|---|---|---|
| 8,121,602 | B2 * | 2/2012 | Yi et al. | 455/436 |
| 2004/0162074 | A1 * | 8/2004 | Chen | 455/437 |
| 2005/0250529 | A1 | 11/2005 | Funnell et al. | |
| 2006/0160541 | A1 | 7/2006 | Ryu | |
| 2009/0238117 | A1 * | 9/2009 | Somasundaram et al. | 370/328 |
| 2010/0027510 | A1 * | 2/2010 | Balasubramanian et al. | 370/332 |
| 2010/0029274 | A1 * | 2/2010 | Deshpande et al. | 455/435.3 |
| 2010/0113026 | A1 * | 5/2010 | Narasimha et al. | 455/436 |
| 2011/0045833 | A1 * | 2/2011 | Kazmi | 455/436 |
| 2011/0129008 | A1 * | 6/2011 | Chmiel et al. | 375/224 |
| 2011/0263262 | A1 * | 10/2011 | Min et al. | 455/438 |

FOREIGN PATENT DOCUMENTS

KR 10-2005-0083260 A 8/2005

OTHER PUBLICATIONS

3GPP TS 25.304 V8.6.0, "User Equipment procedures in idle mode and procedures for cell reselection in connected mode (Release 8)" Jun. 2009 http://www.3gpp.org/ftp/Specs/archive/25_series/25.304-860.zip See 5.2.6 Cell reselection Evaluation Process.

* cited by examiner

*Primary Examiner* — Jinsong Hu
*Assistant Examiner* — Magdi Elhag
(74) *Attorney, Agent, or Firm* — McKenna Long & Aldridge LLP

(57) ABSTRACT

An apparatus and method of determining a mobility state is provided. A user equipment determines a size of a cell to be reselected by performing cell reselection, and determines the mobility state on the basis of the number of cell reselections and a size of the cell. Unnecessary cell reselection can be avoided even if the user equipment enters an area where a micro cell and a macro cell coexist.

9 Claims, 16 Drawing Sheets

FIG. 12
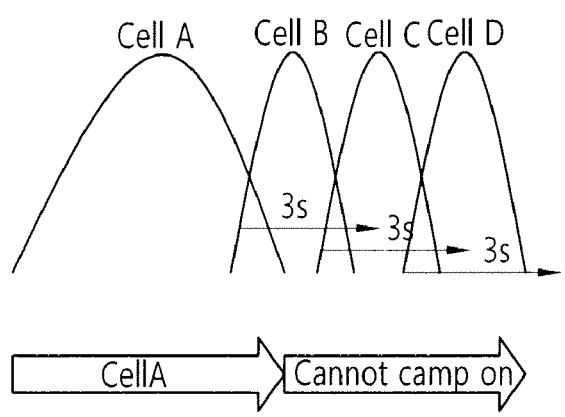
(A)
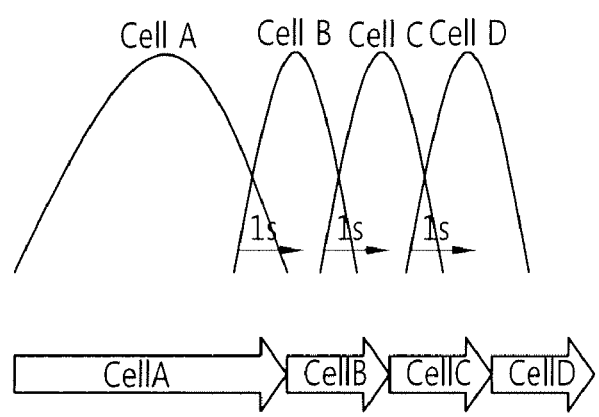
(B)

FIG. 13
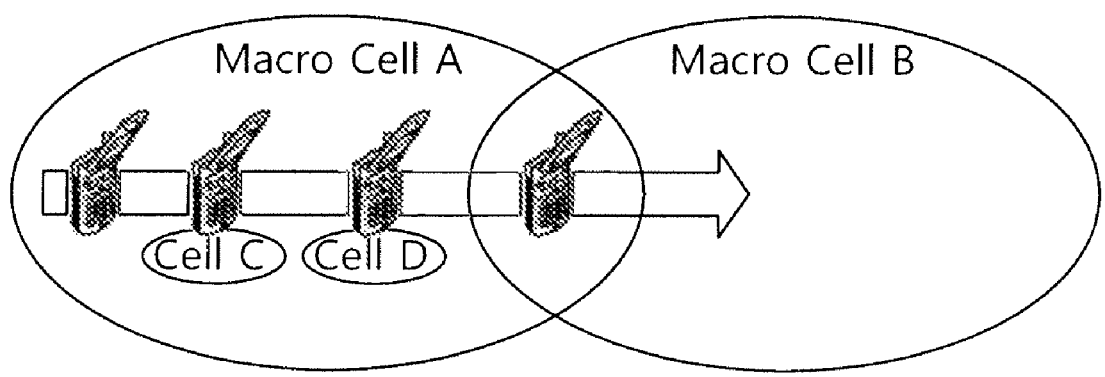
(A)
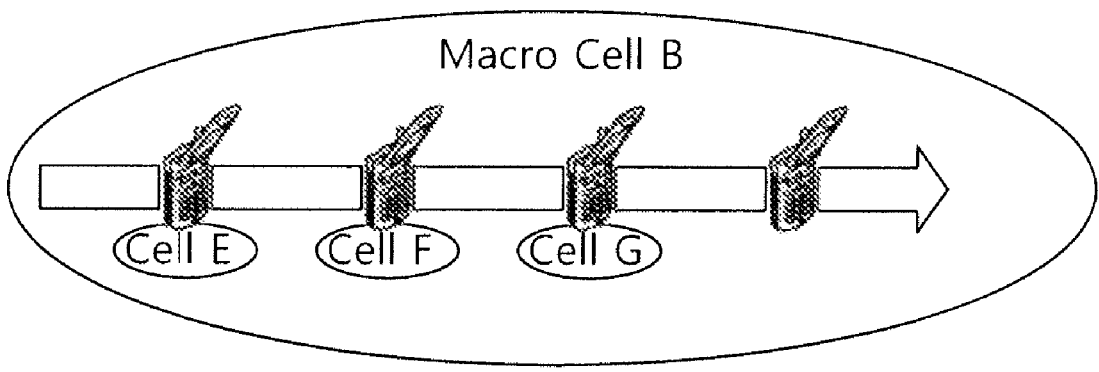
(B)

APPARATUS AND METHOD OF DETERMINING MOBILITY STATE IN WIRELESS COMMUNICATION SYSTEM

CROSS-REFERENCE TO RELATED APPLICATIONS

This application claims the benefit of priority of U.S. Provisional applications 61/228,949 filed on Jul. 27, 2009, 61/233,806 filed on Aug. 13, 2009, and Korean Patent Application No. 10-2010-0070908 filed on Jul. 22, 2010, which are incorporated by reference in their entirety herein.

BACKGROUND OF THE INVENTION

1. Field of the Invention

The present invention relates to wireless communications, and more particularly, to a method and apparatus for determining a mobility state in a wireless communication system.

2. Related Art $3^{rd}$ generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A closed subscriber group (CSG) is introduced to provide a better quality of service by allowing limited access only to a specific subscriber. A base station capable of providing a CSG service is referred to as a home eNodeB (HNB), and a cell providing a licensed service to subscribers of the CSG is referred to as a CSG cell. Basic requirements of the CSG in 3GPP are disclosed in 3GPP TS 22.220 V1.0.1 (2008-12) "Service requirements for Home NodeBs and Home eNodeBs (Release 9)".

Cell selection is a process of selecting a cell in which a service is provided to a user equipment. Cell reselection is a process of reselecting a cell in a state where the user equipment has already selected the cell by completely performing the cell selection.

A mobility state is determined to coordinate the cell reselection according to the mobility of the user equipment.

The CSG cell has a smaller cell size (i.e., a size of coverage provided by the cell) than a normal cell. As cells with various cell sizes coexist, the user equipment may perform unnecessary cell reselection when the cell selection is performed or the mobility state is determined in a conventional manner.

SUMMARY OF THE INVENTION

The present invention provides a method and apparatus for determining a mobility state of a user equipment by considering a cell size.

The present invention also provides a method and apparatus for performing cell selection by considering a cell size.

In an aspect, a method of determining a mobility state of a user equipment in a wireless communication system is provided. The method includes determining a size of a cell to be reselected by performing cell reselection, and determining the mobility state on the basis of the number of cell reselections and a size of the cell.

The mobility state may be one of a normal mobility, a medium mobility, and a high mobility.

The determining of the mobility state may include determining the mobility state to the normal mobility if the number of cell reselections during a mobility period is less than a medium mobility threshold, determining the mobility state to the medium mobility if the number of cell reselections during the mobility period is between the medium mobility threshold and a high mobility threshold, and determining the mobility state to the high mobility if the number of cell reselections during the mobility period is greater than the high mobility threshold.

The method may further include determining whether to increment a counter for indicating the number of cell reselections according to the cell size.

If the reselected cell is a micro cell, the counter may not be incremented.

The micro cell may be a closed subscriber group (CSG) cell.

The method may further include regulating a reselection time on the basis of the mobility state.

In another aspect, a user equipment for determining a mobility state includes a radio frequency (RF) unit for transmitting and receiving a radio signal, and a processor, coupled to the RF unit, for determining the mobility state, wherein the processor is configured to determine a size of a cell to be reselected by performing cell reselection, and determine the mobility state on the basis of the number of cell reselections and a size of the cell.

Unnecessary cell reselection can be avoided even if a user equipment enters an area where a micro cell and a macro cell coexist. In addition, a mobility state of the user equipment can be correctly determined.

BRIEF DESCRIPTION OF THE DRAWINGS

FIG. 12 illustrates cell reselection according to a mobility state of a UE.

FIG. 13 illustrates an example of wrong decision made on a mobility state.

DESCRIPTION OF EXEMPLARY EMBODIMENTS

Figure 1:
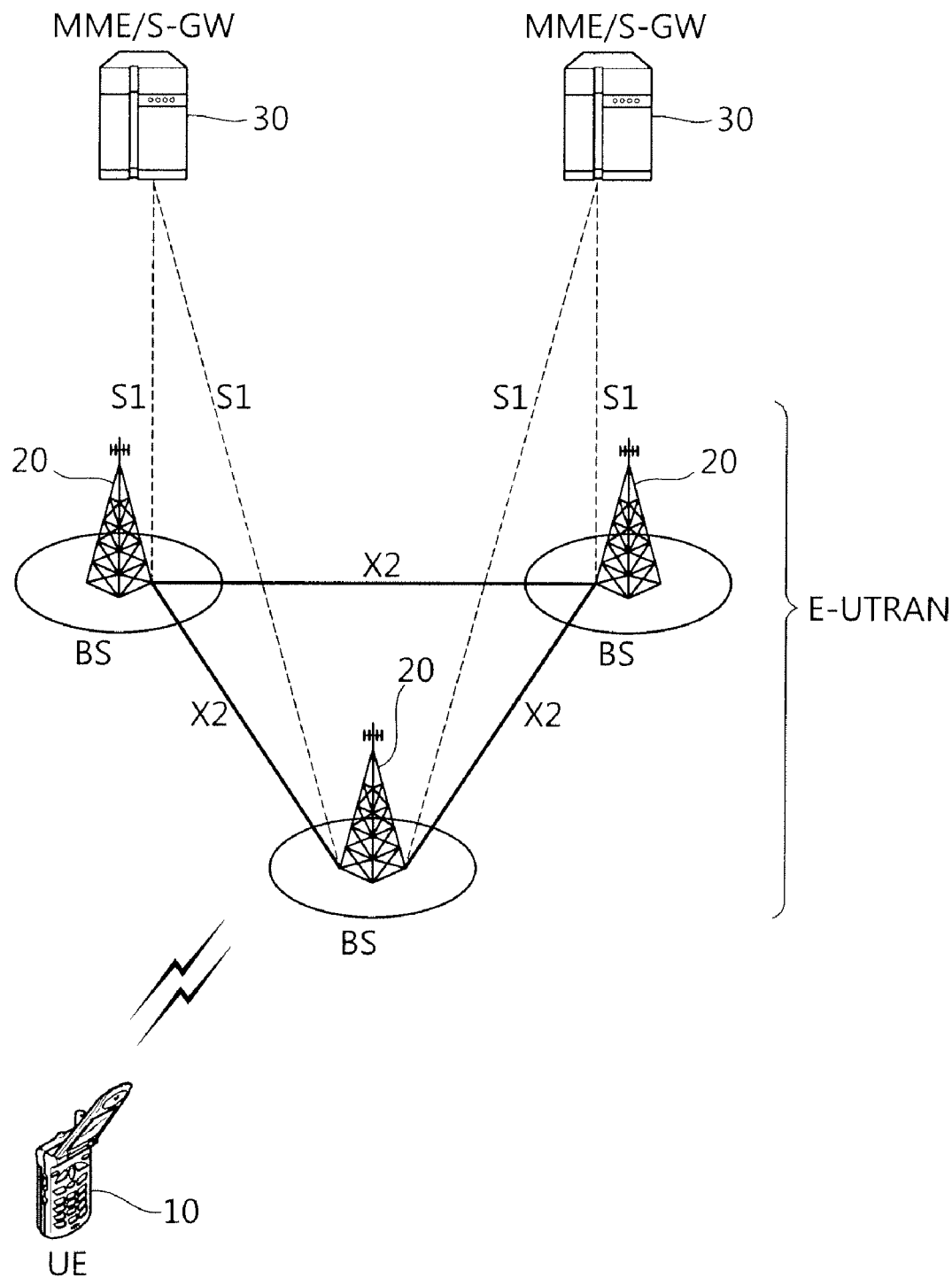
FIG. 1 illustrates a wireless communication system to which the present invention is applied.

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
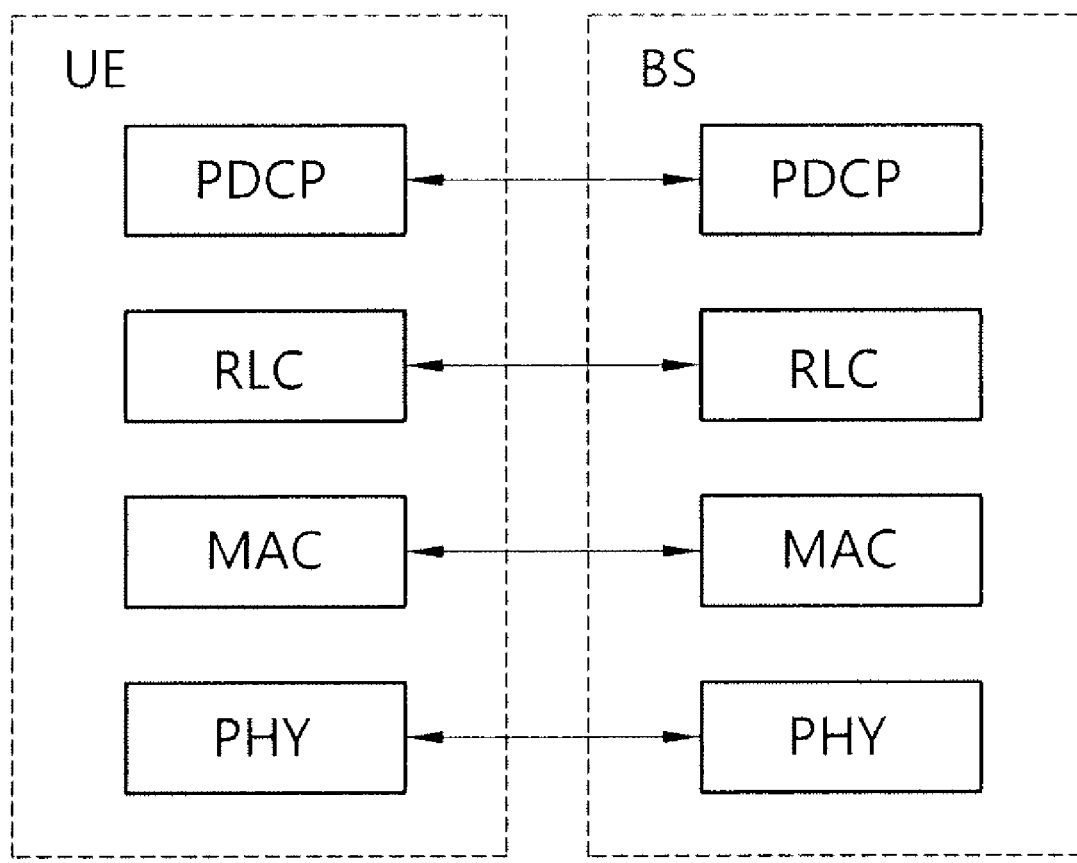
FIG. 2 is a diagram illustrating a radio protocol architecture for a user plane.
Figure 3:
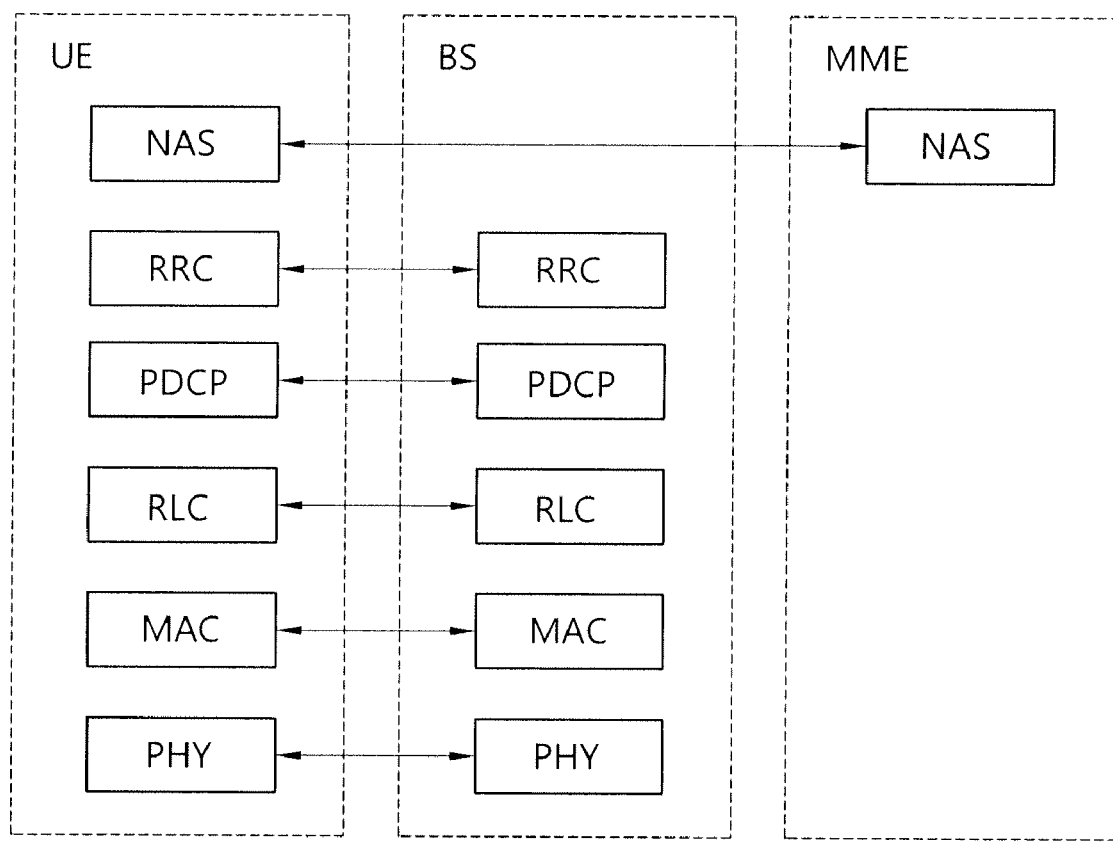
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIG. 2 and FIG. 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network. The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC_CONNECTED mode, and otherwise the UE is in an RRC_IDLE mode.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC_CONNECTED state, and if the two layers are not connected to each other, it is called an RRC_IDLE state. When in the RRC_CONNECTED state, the UE has an RRC connection and thus the E-UTRAN can recognize a presence of the UE in a cell unit. Accordingly, the UE can be effectively controlled. On the other hand, when in the RRC_IDLE state, the UE cannot be recognized by the E-UTRAN, and is managed by a core network in a tracking area unit which is a unit of a wider area than a cell. That is, regarding the UE in the RRC_IDLE state, only a presence or absence of the UE is recognized in a wide area unit. To get a typical mobile communication service such as voice or data, a transition to the RRC_CONNECTED state is necessary.

When a user initially powers on the UE, the UE first searches for a proper cell and thereafter stays in the RRC_IDLE state in the cell. Only when there is a need to establish an RRC connection, the UE staying in the RRC_IDLE state establishes the RRC connection with the E-UTRAN through an RRC connection procedure and then transitions to the RRC_CONNECTED state. Examples of a case where the UE in the RRC_IDLE state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that must be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.4.0 (2008-12) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighbor cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Figure 4:
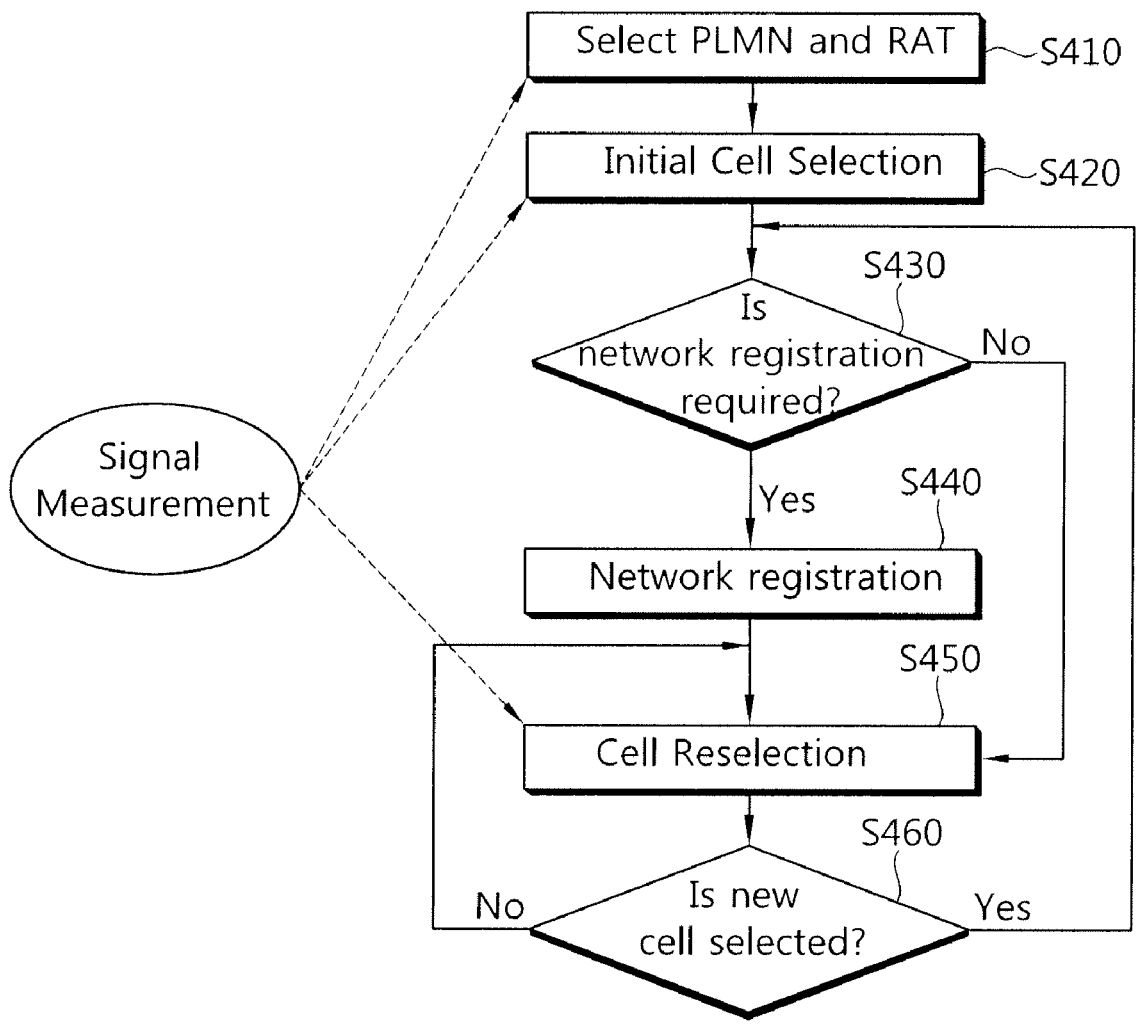
FIG. 4 is a diagram illustrating an operation of a user equipment (UE) selecting a cell in an idle mode.

FIG. 4 is a diagram illustrating an operation of a UE selecting a cell in an idle mode.

The UE selects a Radio Access Technology (RAT) for communicating with a Public Land Mobile Network (PLMN) from which the UE itself desires to receive a service (S410). The information of PLMN and RAT may be selected by the user of the UE, and what is stored in the USIM may be also used.

The UE selects a cell having the largest value among the cells that the measured base station has a value greater than a particular value in the signal intensity and quality (S420). Then, it receives system information being sent by the base station. The particular value denotes a value defined by a system to guarantee the quality of physical signals in the data transmission and/or reception. Accordingly, the value may vary based on the RAT to be applied.

If a network registration is required, the UE registers its own information (for example, IMSI) for receiving a service (for example, paging) from a network (S430, S440). The UE is not registered into a network to be accessed whenever selecting a cell. For example, system information (for example, Tracking Area Identity (TAI)) of the network to be registered is different from network information that the UE itself knows.

If a value of the signal intensity and quality measured by the base station from which the UE receives a service is less than a value measured by the base station of the neighboring cell, then the UE selects one of the other cells providing signals having better characteristics than those of the cell of the base station being accessed by the UE (S450). This process is called a cell reselection to distinguish it from an initial cell selection in the step S420. At this time, a time restriction condition may be specified in order to prevent a cell from being frequently reselected based on the change of the signal characteristics.

Next, a procedure for selecting a cell by the UE will be described in detail.

If the UE is turned on or camps on a cell, the UE may perform procedures for selecting/reselecting a cell having a suitable quality in order to receive a service.

The UE in a RRC_IDLE state needs to select a cell having a suitable quality all the time, and thus be prepared to receive a service through the cell. For example, the UE that has been just turned on selects a cell having a suitable quality to be registered into a network. If the UE that has been in a RRC_CONNECTED state enters into an RRC_IDLE state, then the UE should select a cell in which the UE itself is camped on. In this manner, a process of selecting a cell satisfying a predetermined condition by the UE in order to be camped in a service waiting state such as the RRC_IDLE state, is called a cell selection. The cell selection is performed in a state that the UE does not currently determine a cell in which the UE itself is camped in the RRC_IDLE state, and thus it is very important to select the cell as quickly as possible. Therefore, if it is a cell providing a radio signal quality greater than a predetermined level, then it may be selected during a cell selection process by the UE even though the cell is not a cell providing best radio signal quality.

Hereinafter, by referring to the disclosure 3GPP TS 36.304 V8.3.0 (2008-09) "User Equipment (UE) procedures in idle mode (Release 8)", a method and procedure for selecting a cell by a UE will be described in detail.

If power is initially turned on, the UE searches for available PLMNs and selects a suitable PLMN to receive a service. Subsequently, the UE selects a cell having a signal quality and characteristic capable of receiving a suitable service among the cells being provided by the selected PLMN.

The cell selection process can be classified into two types.

One type is an initial cell selection process, and in this process, the UE does not have previous information on radio channels. Therefore, the UE searches for all the radio channels to find a suitable cell. In each channel, the UE searches for the strongest cell. Subsequently, if a suitable cell satisfying the cell selection criteria is found, then the UE selects the corresponding cell.

The other type is a cell selection process using the stored information, and in this process, the UE uses information on radio channel stored in the UE, or selects a cell by using information being broadcasted from the cell. Accordingly, a cell may be quickly selected compared to an initial cell selection process. If a cell satisfying the cell selection criteria is found, then the UE selects the corresponding cell. If a cell satisfying the cell selection criteria is not found, then the UE performs an initial cell selection process.

The cell selection criteria used by the UE in the cell selection process may be represented by as shown:

$$Srxlev > 0 \quad \text{[Equation 1]}$$

where Srxlev=Qrxlevmeas−(Qrxlevmin+Qrxlevminoffset)−Pcompensation, Qrxlevmeas denotes a measured cell received level (RSRP), Qrxlevmin denotes a minimum required received level in the cell (dBm), Qrxlevminoffset denotes a offset to Qrxlevmin, Pcompensation=max(PEMAX−PUMAX, 0) (dB), PEMAX denotes a maximum transmission power allowed for the UE in the corresponding cell (dBm), and PUMAX denotes a maximum transmission power of the UE radio transmission unit based on the performance of the UE (dBm).

In the above Equation 1, it may be seen that UE selects a cell having a value of the measured signal intensity and quality greater than a particular value specified by the cell providing a service. Furthermore, the parameters used in the above Equation 1 are broadcast via the system information, and the UE receives those parameter values to use them for the cell selection criteria.

If the UE selects a cell satisfying the cell selection criteria, then the UE receives the information required for the RRC_IDLE mode operation of the UE in the corresponding cell from the system information of the corresponding cell. The UE receives all the information required for the RRC_IDLE mode operation, and then waits in an idle mode to request a service (for example, originating call) to a network or receive a service (for example, terminating call) from a network.

After the UE selects a certain cell via a cell selection process, the signal intensity and quality between the UE and the base station may be changed due to the change of the UE mobility and wireless environment. Therefore, if the quality of the selected cell is deteriorated, then the UE may select another cell providing better quality. In this manner, if a cell is reselected, then a cell providing signal quality better than that of a currently selected cell is typically selected. This process is called a cell reselection. A basic object of the cell reselection process is typically to select a cell providing best quality to the UE from a standpoint of the radio signal quality.

In addition to the standpoint of the radio signal quality, the network may notify the UE of its priority by determining it for each frequency. The UE that has received the priority may consider this priority in the first place than the radio signal quality criteria during the cell reselection process.

As described above, there is a method of selecting or reselecting a cell based on the signal characteristics of wireless environment. When reselecting a cell, in selecting a cell for the reselection, there may be cell reselection methods as described below, based on the RAT and frequency characteristics of a cell.

Intra-frequency cell reselection: A cell having a center-frequency similar to the RAT of the cell currently being used by the UE is reselected.

Inter-frequency cell reselection: A cell having a center-frequency different from the RAT of the cell currently being used by the UE is reselected.

Inter-REAT cell reselection: A cell using a different RAT from the RAT currently being used by the UE is reselected.

The principles of cell reselection are as follows.

First, a UE may measure the quality of a serving cell and/or the quality of a neighboring cell for cell reselection.

Second, the cell reselection may be performed based on cell reselection criteria. The cell reselection criteria have following characteristics with regard to the measurement of cells.

Intra-frequency cell reselection may be performed based on the rankings of cells. The rankings may be a procedure to define a ranking criterion and to order the cells based on the ranking criterion. A highest-ranking cell is referred to as a best-ranked cell. A ranking value may be a measured result provided by a UE or may be the adjusted value of applying a frequency offset or cell offset to the measured result.

Inter-frequency cell reselection may be performed based on the priorities of frequencies which are provided by a BS. A UE may attempt to camp on a cell at a frequency with a highest priority. A network may provide frequency priorities to UEs via broadcast signaling or via dedicated signaling.

For inter-frequency cell reselection, a network may provide parameters (e.g., frequency-specific offsets) for use in cell reselection to each UE.

For intra- or inter-frequency cell reselection, a network may provide a neighboring cell list (NCL) for use in cell reselection to each UE. The NCL may include cell-specific parameters (e.g. cell-specific offsets).

For intra- or inter-frequency cell reselection, a network may provide a blacklist including a number of cells that should not be reselected to each UE. The cells included in the blacklist may not be subjected to cell reselection.

The rankings of cells will hereinafter be described in further detail.

A ranking criterion for ranking cells may be defined by as shown:

$$Rs = Q\text{meas},s + Q\text{hyst}, Rn = Q\text{meas},n - Q\text{offset} \quad \text{[Equation 2]}$$

where Rs indicates a ranking value of a serving cell, Rn indicates a ranking value of a neighboring cell, Qmeas,s indicates the quality of the serving cell measured by a UE, Qmeas,n indicates the quality of the neighboring cell measured by the UE, Qhyst indicates a hysteresis value for ranking, and Qoffset indicates an offset between two cells1.

In intra-frequency cell reselection, if a UE receives an offset Qoffsets,n between the serving cell and the neighboring cell, Qffoset=Qoffsets,n. Otherwise, Qffoset=0.

In inter-frequency cell reselection, if the UE receives the offset Qoffsets,n, Qoffset=Qoffsets,n+Qfrequency. Otherwise, Qoffset=Qfrequency.

If the ranking values of the serving cell and the neighboring cell are not much different from each other and constantly vary, the rankings of the serving cell and the neighboring cell may change frequently. Thus, the serving cell and the neighboring cell may be alternately selected as a new serving cell too often. In order to address this problem, the hysteresis value Qhyst may be used.

A UE may determine the rankings of the serving cell and the neighboring cell using Equation (2), may determine whichever of the serving cell and the neighboring cell has a higher ranking value than the other cell as a best-ranked cell, and may select the best-ranked cell as a new serving cell.

In the above-mentioned cell reselection criterion, the quality of cells is considered as most important factor when performing cell reselection. If a reselected cell is not a suitable cell, a UE may exclude the reselected cell or the frequency of the reselected cell.

Now, speed scaling having an effect on cell reselection depending on a moving speed of a UE will be described.

When the UE passes cells at a fast speed, there may be a case where cell reselection is not correctly performed and the UE is unable to camp on a specific cell. This problem is caused by a reselection time (i.e., Treselection) for preventing unnecessary cell reselection.

If neighboring cell's signal strength measured by the UE during the Treselection is greater than a specific value, cell reselection is performed, and if the moving speed of the UE is fast, there is a case where a cell reselection condition cannot be satisfied by using the existing Treselection. Therefore, if the moving speed of the UE changes, the Treselection is decreased so that the cell reselection condition is satisfied in a fast moving speed, which is referred to as speed scaling. The speed change of the UE is determined by comparing the number of cell reselections during a specific time period with a specific value.

Hereinafter, Closed Subscriber Group (CSG) will be described.

A base station which provides CSG service is called a Home Node B (HNB) or Home eNB (HeNB) in 3GPP. Hereinafter, both the HNB and HeNB are commonly designated as a HNB. An object of the HNB is basically to provide specialized services only to a member of the CSG. However, those services may be provided to other users in addition to the CSG based on the operation mode setting of the HNB.

Figure 5:
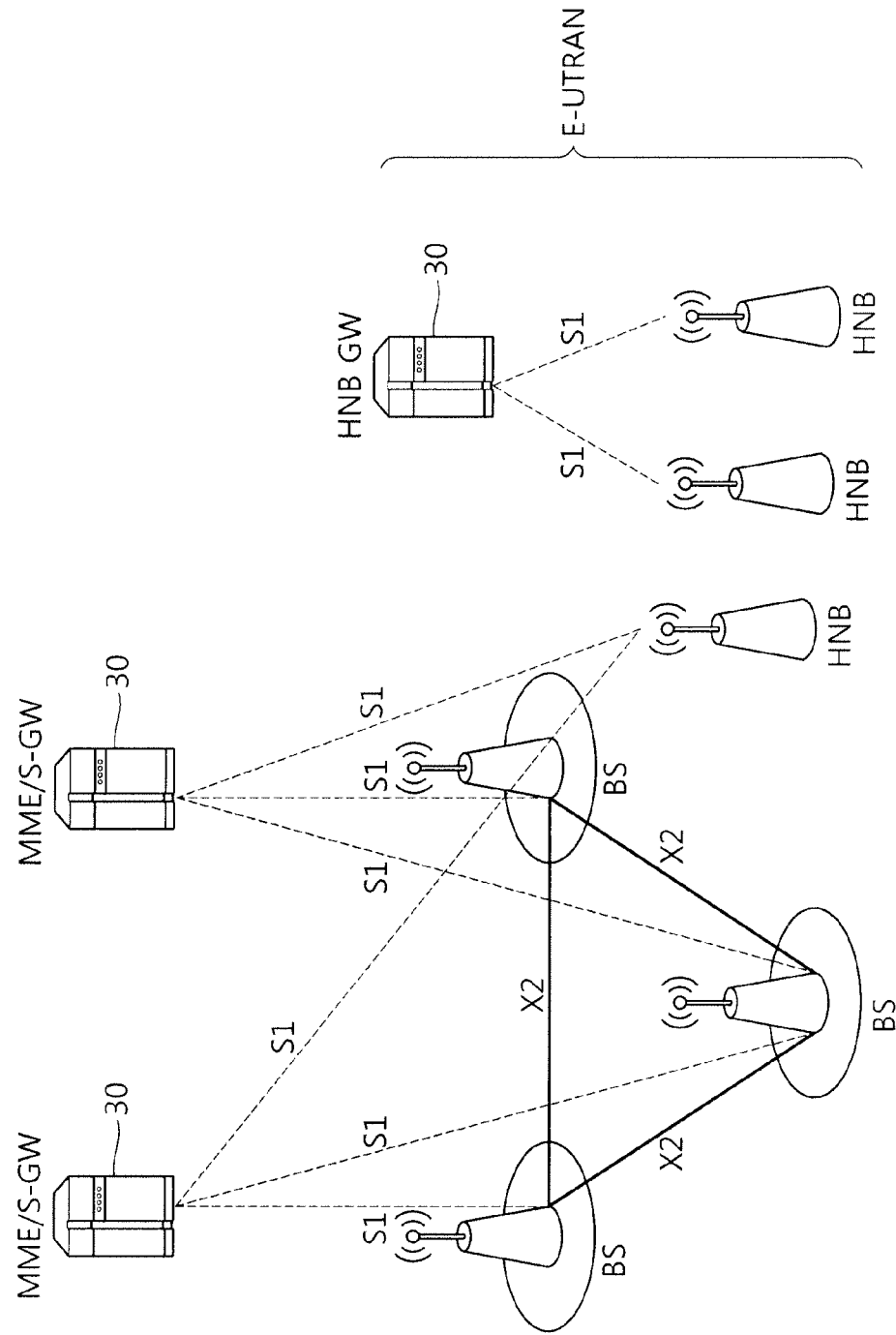
FIG. 5 is an exemplary view illustrating a network architecture for managing a home node B (HNB) by using an HNB gateway (GW).

FIG. 5 is an exemplary view illustrating a network architecture for managing an HNB by using an HNB gateway (GW).

HNBs may be connected to EPC via HNB GW or directly connected to EPC. Here, the HNB GW is regarded as a typical BS to MME. Also, the HNB GW is regarded as the MME to the HNB. Therefore, an S1 interface is connected between HNB and HNB GW, and also an S1 interface is connected between the HNB GW and the EPC. Furthermore, even in case of directly connecting between HNB and EPC, it is connected via an S1 interface. The function of HNB is almost similar to the function of a typical BS.

In general, HNB has a low radio transmission output power compared to the BS owned by mobile communication service providers. Therefore, the service coverage provided by HNB is typically smaller than the service coverage provided by (e)NB. Due to such characteristics, the cell provided by HNB is classified as a femto cell in contrast to a macro cell provided by (e)NB from a standpoint of the service coverage.

From a standpoint of provided services, when HNB provides those services only to a CSG group, the cell provided by this HNB is referred to as a CSG cell.

Each CSG has its own identifier which is called a CSG ID (CSG identity). The UE may have a CSG list to which the UE itself belongs as a member thereof, and this CSG list may be changed by a request of the UE or a command of the network. In the current specification of the 3GPP, one HNB may support one CSG.

A UE has a list of CSGs to which the UE belongs as a member. This list is called as a CSG white list.

HNB delivers the CSG ID of the CSG being supported by itself through the system information, thereby allowing only the corresponding CSG member UE to be accessed. When a CSG cell is found by the UE, what type of CSG being supported by this CSG cell can be checked by reading the CSG ID included in the system information. The UE that has read the CSG ID regards the corresponding cell as an accessible cell only if the UE itself is a member of the corresponding CSG cell or the CSG corresponding to the CSG ID is included in the UE's CSG white list.

It is not always required for HNB to allow the CSG UE to be accessed. Based on the configuration setting of HNB, non-CSG member UE may be allowed to be accessed. The type of UE allowed to be accessed may be changed based on the configuration setting of HNB. Here, the configuration setting denotes the setting of the access mode (or may be called as operation mode) of HNB. The access mode of HNB can be divided into three types as follows based on the type of UE.

1) Closed access mode: A mode in which services are provided to particular CSG members only. A CSG cell is provided by the HNB.

2) Open access mode: A mode in which services are provided without any restriction of particular CSG members like typical (e)NB. The HNB provides a typical cell not a CSG cell. For clarity, a macro cell is a cell operated by the open access mode.

3) Hybrid access mode: A mode in which CSG services are provided to particular CSG members and also services are provided to non-CSG members like a typical cell. It is recognized as a CSG cell for the CSG member UE, and recognized as a typical cell for the non-CSG member UE. This cell is called a hybrid cell.

HNB notifies the UE that the cell being serviced by itself is a CSG cell or typical cell, allowing the UE to know whether or not it can be accessed to the corresponding cell. HNB being managed in a closed access mode broadcasts via the system information that it is a CSG cell. In this manner, HNB allows the system information to include a CSG indicator indicating whether or not the cell being serviced by itself is a CSG cell in the system information.

For example, the CSG cell broadcasts by setting the CSG indicator to 'TRUE'. If the cell being serviced is not a CSG cell, then it may be used a method that the CSG indicator may be set to 'FALSE' or the transmission of the CSG indicator is omitted. The UE should distinguish a typical cell from a CSG cell, and thus a typical BS may also transmit the CSG indicator (for example, the CSG indicator set to 'FALSE'), thereby allowing the UE to know that the cell type provided by itself is a typical cell. Furthermore, the typical BS may not transmit the CSG indicator, thereby allowing the UE to know that the cell type provided by itself is a typical cell, too.

The CSG-related parameters transmitted by the corresponding cell for each cell type are represented in Table 1. The CSG-related parameters may be transmitted via system information.

TABLE 1

|  | CSG Cell | Typical Cell |
| --- | --- | --- |
| CSG Indicator | 'CSG Cell' is indicated | 'Non-CSG cell' is indicated, or not transmitted |
| CSG ID | Supported CSG ID is transmitted | Not transmitted |

The types of UE allowed to be accessed for each cell type are represented in Table 2.

TABLE 2

|  | CSG Cell | Typical Cell |
| --- | --- | --- |
| UE not supporting CSG | Access denied | Access accepted |
| Non-CSG member UE | Access denied | Access accepted |
| CSG member UE | Access accepted | Access accepted |

Figure 6:
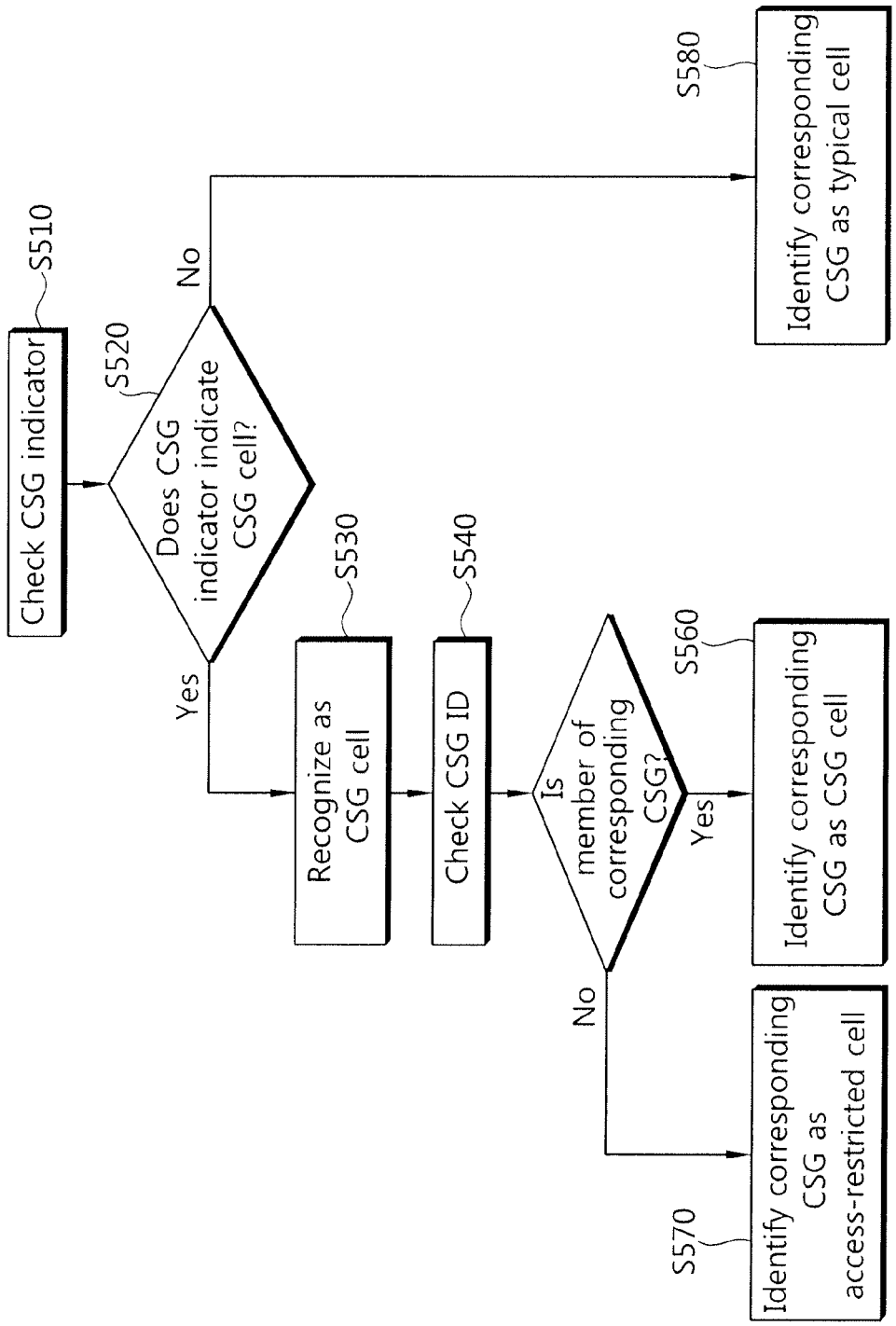
FIG. 6 is a flowchart illustrating a method of checking an access mode of a base station by a UE.

FIG. 6 is a flowchart illustrating a method of checking the access mode of a base station by a UE.

The UE checks a CSG indicator in system information of a target cell in order to confirm what is the type of the target cell (S510).

After checking the CSG indicator, if the CSG indicator indicates that the target cell is a CSG cell, then the UE recognizes the corresponding cell as the CSG cell (S520, S530). The UE checks the CSG ID in the system information in order to check whether or not the UE itself is a CSG member of the target cell (S540).

If it is checked from the CSG ID that the UE is a CSG member of the target cell, then the corresponding cell will be recognized as an accessible CSG cell (S550, S560). If it is checked from the CSG ID that the UE is not a CSG member of the target cell, then the corresponding cell will be recognized as an inaccessible CSG cell (S550, S570).

If the CSG indicator indicates that the target cell is not a CSG cell, then the UE recognizes the target cell as a typical cell (S520, S580). Furthermore, if the CSG indicator is not transmitted in the step S510, the UE recognizes the object cell as a typical cell.

In general, CSG cells and macro cells may be concurrently managed in a particular frequency. A CSG dedicated frequency is a frequency in which CSG cells exist only. A mixed carrier frequency is a frequency in which CSG cells and macro cells exist. The network may reserve a physical layer cell identifier for the CSG cell in a mixed carrier frequency. The physical layer cell identifier is called a Physical Cell Identity (PCI) in E-UTRAN, and called a Physical Scrambling Code (PSC) in UTRAN. For clarity, the physical layer cell identifier will be expressed by PCI.

The CSG cell notifies information on the PCI reserved for CSG cell at a current frequency via the system information. The UE that received this information can determine whether or not this cell is a CSG cell from the PCI of the cell when a certain cell is found at the corresponding frequency. How this information being used by the UE will be illustrated below in case of two types of UE.

First, in case of the UE, not supporting the CSG-related function or having no CSG list to which the UE itself belongs, the UE does not need to regard a CSG cell as a selectable cell during the cell selection/reselection process or handover. In this case, the UE checks only the PCI of the cell, and then the UE may immediately eliminate the corresponding cell during the cell selection/reselection process or handover if the PCI is a reserved PCI for CSG. Typically, the PCI of a certain cell may be immediately known during a process of checking the existence of the corresponding cell in a physical layer by the UE.

Second, in case of the UE having a CSG list to which the UE itself belongs, when the UE wants to know a list of the neighboring CSG cells at a mixed carrier frequency, it may be known that the corresponding cell is a CSG cell if only a cell having the PCI reserved for CSG is found, instead of individually checking the CSG identity of the system information of every cell found in the whole PCI range.

It will hereinafter be described how to perform cell reselection related to a CSG cell.

A CSG cell is a cell for providing better-quality services, i.e., CSG services, to its member UEs. Since UE may be typically serviced with better Quality of Service (QoS) in a CSG cell than in non-CSG cell, when a UE camps on the CSG cell, the selection of another cell may not be appropriate in terms of QoS even if an inter-frequency of a higher priority than a serving frequency is found.

In order to prevent a cell at an inter-frequency of a higher priority than a serving frequency from being selected over a serving CSG cell during reselection process, a UE may assume the serving frequency to have the highest priority of all other frequencies as long as the serving CSG cell is evaluated as the best-ranked cell on the corresponding frequency.

In order to encourage a UE to reselect a CSG cell at inter-frequency other than non-CSG cell at intra/inter-frequency regardless of a frequency priority of the CSG cell, the UE may assume that the frequency of the CSG cell to have the highest priority of all other frequencies as long as the CSG cell is evaluated as the best ranked cell on the corresponding frequency.

When the UE gives the highest priority to a specific frequency without any explicit network signaling, this frequency priority may be called as 'implicit highest priority'. In this manner, it is possible to help the UE camp on the CSG cell as much as possible without violating the existing cell reselection rule that cell reselection is performed based on the priorities of frequencies.

Figure 7:
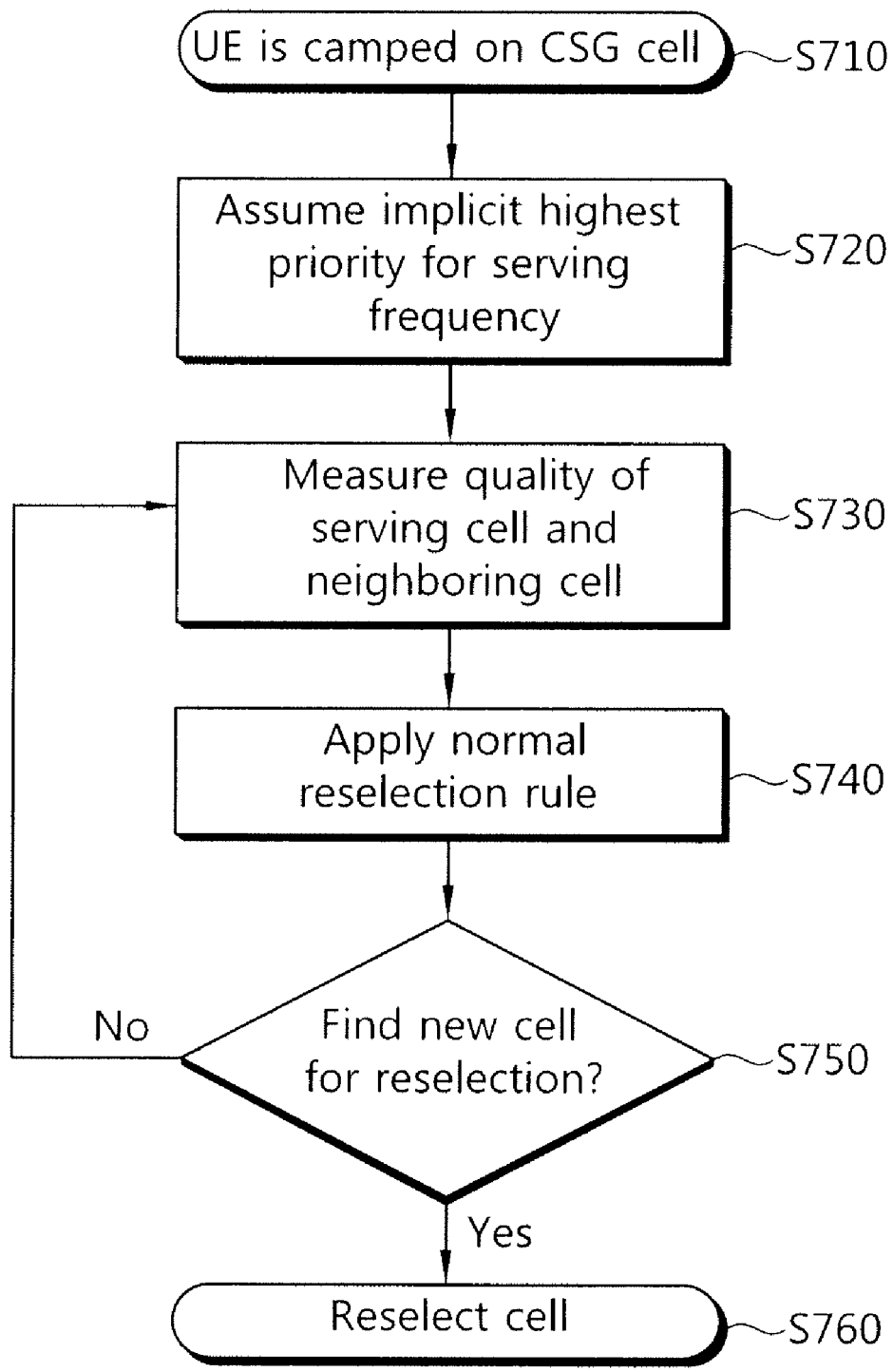
FIG. 7 illustrates a conventional cell reselection method.

FIG. 7 illustrates a conventional cell reselection method.

A UE camps on a CSG cell (S710).

Since a serving cell of the UE is the CSG cell, an implicit highest priority may be assigned to a serving frequency (S720).

The UE may measure the quality of the serving CSG cell and a neighboring cell (S730).

The UE may apply a normal reselection rule based on the measurement results performed in step S730 (S740). More specifically, the UE may search a best ranked cell in a frequency of a higher priority than the serving frequency. If no best-ranked cell is found from the frequency of a higher priority than the serving frequency, the UE may search the best ranked cell in a frequency having the same priority as that of the serving frequency. If no best-ranked cell is found from the frequency having the same priority as that of the serving frequency, the UE may search the best ranked cell in a frequency of a lower priority than the serving frequency.

If a new cell is found (S750), the UE may reselect the new cell (S760).

If the reselected cell is a non-CSG cell, the UE may withdraw the implicit highest priority assigned to the serving CSG cell, and may use frequency priorities provided by a network for cell reselection.

If the UE finds a new best-ranked CSG cell from a frequency having the same priority as that of the serving frequency, the UE may decide whether to stay in the current serving CSG cell or reselect the new best-ranked CSG cell.

In cell reselection, the UE uses a reselection time, i.e., Treselection, received from the network to determine whether cell reselection is necessary. According to the conventional method, however, unnecessary cell reselection may be performed in a situation where a cell having a small cell size such as a CSG cell (such a cell is referred to as a micro cell) and a normal cell (such a cell is referred to as a macro cell).

Figure 8:
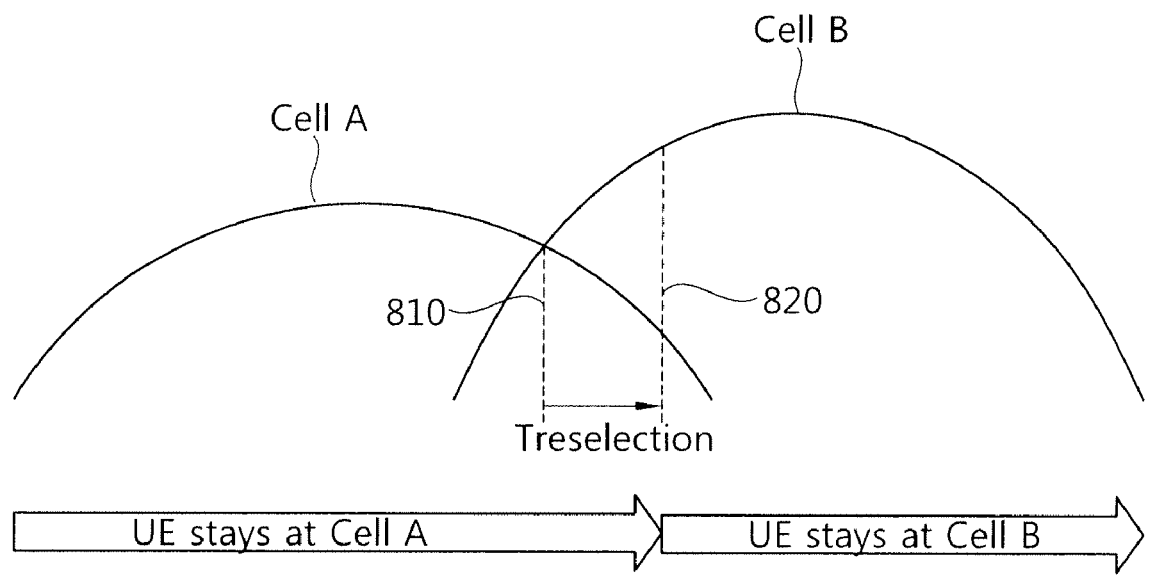
FIG. 8 shows cell reselection using a reselection time.

FIG. 8 shows cell reselection using a reselection time. If a UE is moving from a cell A to a cell B, signal quality of the cell A is getting worse whereas signal quality of the cell B is getting better.

If the signal quality of the cell A is less than a first threshold Th1 and the signal quality of the cell B is greater than a second threshold Th2, a reselection timer Tr starts (810). The first threshold Th1 and the second threshold Th2 may be equal to each other, or may satisfy Th1>Th2 or Th1<Th2.

The reselection time, i.e., Treselection, is a timer value of the reselection timer Tr. If the signal quality of the cell B is constantly greater than the second threshold Th2 (and/or the signal quality of the cell A is constantly less than the first threshold Th1) until the reselection timer Tr expires, the UE reselects the cell B (820).

The Treselection is used to prevent cell reselection from frequently occurring unnecessarily.

Figure 9:
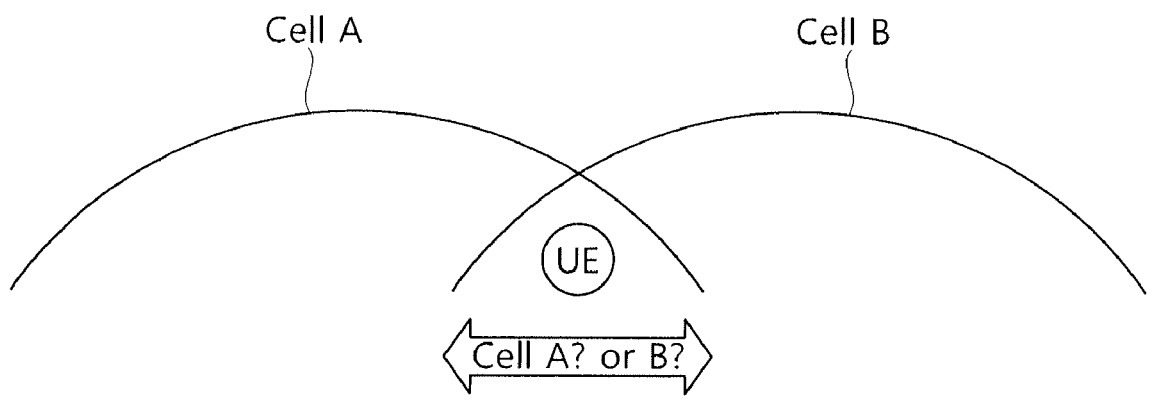
FIG. 9 shows a situation where a reselection time is not used.

FIG. 9 shows a situation where a reselection time is not used. In this situation, a UE repetitively reselects a cell A and a cell B when the UE stays at a boundary between the cell A and the cell B. By the use of the Treselection, unnecessary cell reselection can be avoided even if the UE stays at the boundary between the two cells.

In general, in order to decrease delay occurring in cell reselection, the Treselection is set to a relatively small value (e.g., 1 sec or 2 sec). According to 3GPP TS 36.331, the Treselection can be set to a value in the range of 0 sec to 7 sec.

However, if the UE passes an area where a micro cell having a small cell size (e.g., a CSG cell) exists, there may be a case where CSG cells having a small cell size are continuously reselected. In a case where the UE simply passes around the CSG cell, if the CSG cell is reselected in the cell reselection, it may result in increase of battery consumption of the UE.

When the UE passes micro cells, unnecessary cell reselection may not be able to be prevented even if the existing Treselection is used. Although the Treselection is set to 7 sec which is a maximum value, if it is assumed that an average walking speed of human is 3.0 km/h, the coverage of an area that can be covered by the Treselection is about 5.8 m. Therefore, if the coverage of the micro cell is 10-20 m, there may be a problem in which the UE unnecessarily reselects the micro cell even if the UE passes the micro cell.

Figure 10:
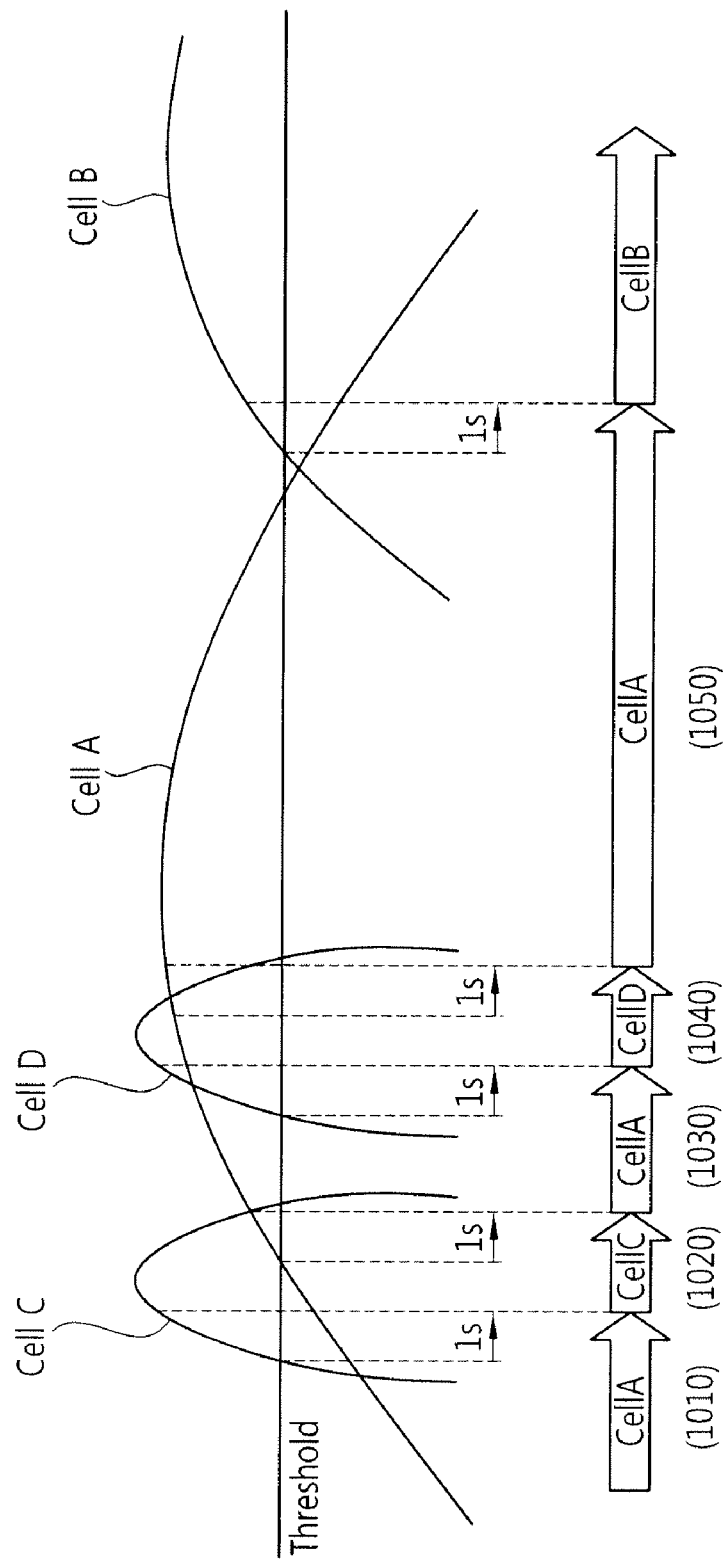
FIG. 10 shows an example of unnecessary cell reselection.

FIG. 10 shows an example of unnecessary cell reselection. A cell A and a cell B are macro cells, and a cell C and a cell D are micro cells included in the coverage of the cell A. Treselection is 1 sec.

A UE initially camps on the cell A (step 1010).

As the UE approaches to the cell C, if signal quality of the cell C is consistently greater than a threshold during the Treselection, the cell C is reselected (step 1020).

As the UE is separated from the cell C, if the signal quality of the cell A is consistently greater than the threshold during the Treselection, the cell A is reselected (step 1030).

Likewise, the UE reselects the cell D (step 1040), and reselects the cell A again (step 1050).

When micro cells such as the CSG cell use the same Treselection value as that used in the macro cell, cell reselection is continued as the UE moves. The cell reselection repetitively performed may result in the increase of battery consumption of the UE.

According to the proposed method, a size of a cell to be reselected is recognized and the Treselection is applied according to the cell size.

By allowing the UE to use a suitable Treselection for the cell size in the process of cell reselection, the UE is prevented from unnecessary cell reselection. For example, in order to prevent the UE from unnecessarily reselecting micro cells, the Treselection may be set to a value higher than that used for the micro cell (e.g., a value greater than 7 sec).

Figure 11:
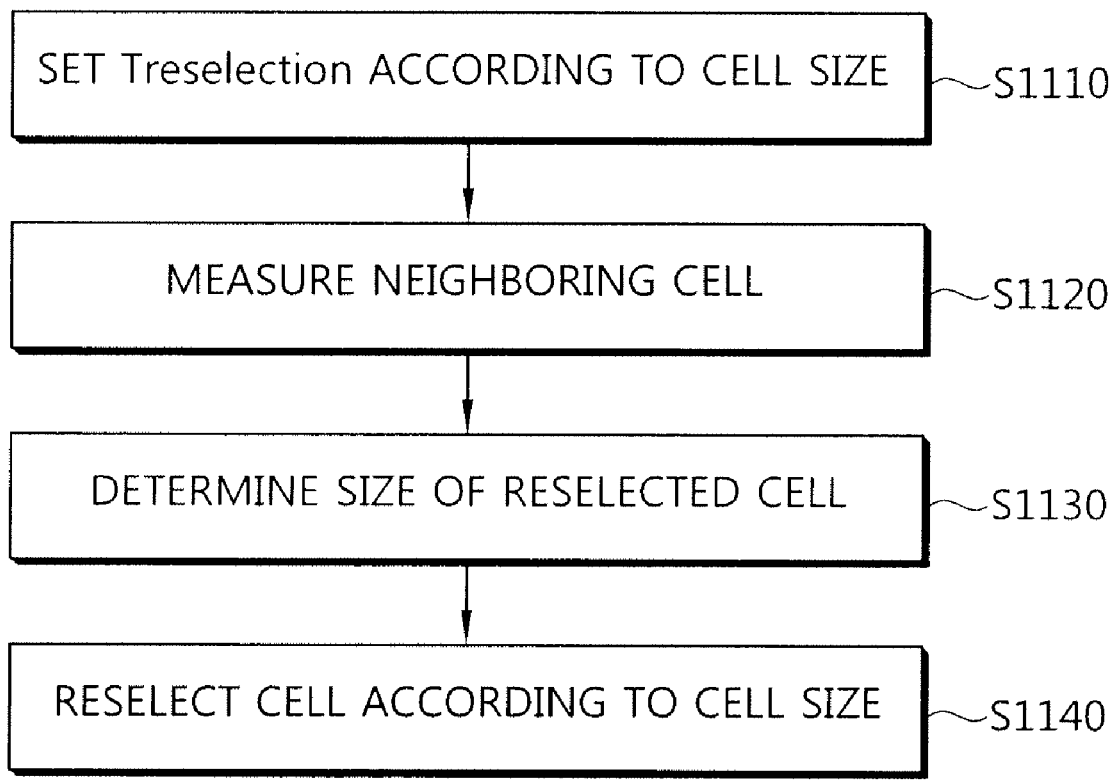
FIG. 11 is a flowchart illustrating a cell reselection method according to an embodiment of the present invention.

FIG. 11 is a flowchart illustrating a cell reselection method according to an embodiment of the present invention.

A UE sets a Treselection according to a cell size (step S1110). In order to set the Treselection according to the cell size, the UE can receive a reselection parameter from a BS (i.e., a serving cell).

In one embodiment, the reselection parameter may include information on a Treselection value of each cell according to the cell size. For example, the reselection parameter may include a first Treselection $T_{micro}$ for a micro cell and/or a second Treselection $T_{macro}$ for a macro cell.

In another embodiment, the reselection parameter may include information for setting the Treselection according to the cell size. For example, the reselection parameter may include information on a scaling factor $\beta$. In the presence of the Treselection $T_{macro}$ for the macro cell, the Treselection of the micro cell is $T_{micro}=\beta*T_{macro}$. In this case, $\beta$ may satisfy $\beta>1$.

The reselection parameter may be reported by the BS to the UE through a part of system information, an RRC message, a MAC message or a PDCCH.

The UE measures signal quality of a neighboring cell (step S1120).

The UE determines a size of the neighboring cell (step S1130). A method of determining the cell size is described below.

Although it is described herein that the UE determines the cell size after starting quality measurement, the cell size may be determined irrespective of whether the quality measurement starts.

The UE performs cell reselection by considering the size of the neighboring cell (step S1140). If signal quality of the neighboring cell is greater than a threshold (and/or if signal quality of the serving cell is less than the threshold), a reselection timer starts. In this case, the Treselection is determined according to the cell size. For example, if the neighboring cell is a micro cell, the first Treselection $T_{micro}$ is used, and if the neighboring cell is a macro cell, the second Treselection $T_{macro}$ is used. If the signal quality of the neighboring cell is maintained during the Treselection, a corresponding cell is reselected.

Now, a method of determining a cell size by a UE will be described.

In one embodiment, the UE can determine the cell size on the basis of a PCI. Upon receiving a primary synchronization signal and a secondary synchronization signal of a neighboring cell, the UE can obtain the PCI. $N^{(2)}_{ID}$ is obtained from the primary synchronization signal, and $N^{(1)}_{ID}$ is obtained from the secondary synchronization signal. $PCI=3N^{(1)}_{ID}+N^{(2)}_{ID}$. Since $N^{(1)}_{ID}$ is ranged from 0 to 2 and $N^{(2)}_{ID}$ is ranged from 0 to 167, a total number of PCI is 504.

Different cell type may have different PCI. For example, it is assumed that the entire PCI set is called as $PCI_{total}$ and the PCI set for micro cells is called as $PCI_{micro}$. The PCI set for macro cells $PCI_{macro}$ can be $PCI_{macro}=PCI_{total}-PCI_{micro}$. Accordingly, if the UE checks the PCI of the neighboring cell, the UE can know the type of the neighboring cell is a macro cell or a micro cell.

In another embodiment, the UE can determine the cell size on the basis of a cell size indicator transmitted from a BS.

The cell size indicator can be reported by the BS to the UE through a part of system information, an RRC message, a MAC message or a PDCCH. The cell size indicator may be included in a measurement configuration message for configuring measurement of the neighboring cell.

The cell size indicator may be a 1-bit field. For example, if the cell size indicator is set to '0', it may indicate the macro cell, and if the cell size indicator is set to '1', it may indicate the micro cell.

The UE can regard a CSG indicator as the cell size indicator. Since a CSG cell serves small coverage, the UE can regard a CSG cell as a micro cell when the CSG indicator indicates the corresponding cell is the CSG cell.

The cell size indicator may include various bit fields. By combination of various bit fields, the cell size indicator may indicate various cell sizes.

The UE may receive the cell size indicator and/or the CSG indicator. The UE store the information for the cell size (i.e. PCI, the cell size indicator and/or the CSG indicator in a memory. The UE can identify the cell size of the neighboring cell during handover or cell reselection based on the information in the memory.

According to the proposed method, unnecessary cell reselection can be avoided even if the UE enters an area where the micro cell and the macro cell coexist. In addition, UEs can restrict cell reselection according to the cell size.

Now, a method of determining a mobility state of a UE according to a cell size will be described.

In the aforementioned embodiment, unnecessary cell reselection is avoided by directly regulating the Treselection according to the cell size. In comparison thereto, a method described below determines the mobility state of the UE according to the cell size and reselects a cell on the basis of the determination result.

According to the section 5.2.4.3 of 3GPP TS 36.304 V8.3.0 (2008-09), the mobility state of the UE is classified into a normal mobility, a medium mobility, and a high mobility on the basis of how many times a cell is reselected during a specific time period.

A method of determining the mobility state of the UE is as follows. In order to determine the medium mobility and the high mobility in addition to the normal mobility, three parameters, i.e., a mobility period $T_{CR}$, a medium mobility threshold $N_{CR-M}$, and a high mobility threshold $N_{CR-H}$, are used.

If the number of cell reselections is between $N_{CR-M}$ and $N_{CR-H}$ during the mobility period, the mobility state is determined to the medium mobility.

If the number of cell reselections is greater than $N_{CR-H}$ during the mobility period, the mobility state is determined to the high mobility.

Radio quality of a cell measured by the UE rapidly changes as a moving speed of the UE increases. In order for the UE to properly perform cell reselection, it is necessary to decrease the Treselection value. This is because, if the Treselection does not change along with the moving speed of the UE, the UE stays in the cell for a time similar to the Treselection in a state where the UE moves at a fast speed, and thus no cell is reselected, which may lead to a problem in that the UE cannot receive a service.

FIG. 12 illustrates cell reselection according to a mobility state of a UE. A Treselection is 3 sec in a subfigure (A) of FIG. 12 and is 1 sec in a subfigure (B) of FIG. 12. It is assumed that a cell A is a macro cell, and cells B, C, and D are micro cells.

Referring to the subfigure (A) of FIG. 12, even if the UE moves in the order of the cell A, the cell B, the cell C, and the cell D in a state where the serving cell is the cell A, the UE cannot reselect any cell among the cells B, C, and C since a relatively great Treselection is not satisfied.

Referring to the subfigure (B) of FIG. 12, the UE moves in the order of the cell A, the cell B, the cell C, and the cell D in a state where the serving cell is the cell A, and thus the Treselection becomes relatively short. Therefore, the UE sequentially reselects the cells B, C, and D.

By determining the mobility state, the UE can adjust the Treselection which is one of factors of determining cell reselection according to the mobility of the UE. If the mobility is high, the Treselection is decreased.

However, if the mobility state of the UE is determined by simply using only the number of cell reselections in a situation where a macro cell and a micro cell coexist, a wrong Treselection value may be determined.

When micro cells are deployed inside macro cells, even if a moving speed of the UE does not change, cell reselection may frequently occur due to the micro cells. Therefore, when using the conventional method of determining the mobility state, the UE may incorrectly determine the mobility state.

When the UE incorrectly determines the mobility state, the wrong Treselection value may be determined. In this case, even if the speed does not change, a high mobility state is determined and thus the Treselection is decreased. As a result, unnecessary cell reselection may be performed.

FIG. 13 illustrates an example of wrong decision made on a mobility state.

Referring to the subfigure (A) of FIG. 13, when a UE moves from a macro cell A to a macro cell B, cell reselection is performed one time in the absence of a micro cell. On the other hand, cell reselection is performed three times in the presence of micro cells, i.e., cells C and D.

Therefore, even though a moving speed of the UE does not change, cell reselection is performed more frequently, and thus the mobility state may change from a normal mobility to a medium mobility or a high mobility.

Consequently, the Treselection becomes short according to the change of the mobility state, and cell reselection can be performed more frequently.

Referring to the subfigure (B) of FIG. 13, cell reselection is performed more frequently as the Treselection becomes short in the subfigure (A) of FIG. 13. It is assumed that the UE changes its mobility state to a high mobility in the subfigure (A) of FIG. 13 and thus the Treselection becomes short.

If the Treselection for the normal mobility is used, a cell E or a cell F having a small coverage may not be reselected. However, since the UE has already decreased the Treselection, the UE can reselect all of the cells E, F, and G while moving inside the cell B.

As a result, there is a problem in that power consumption of the UE increases, and radio resources are wasted due to unnecessary signaling.

Therefore, in the proposed method, the mobility state of the UE is estimated by considering a cell size.

Figure 14:
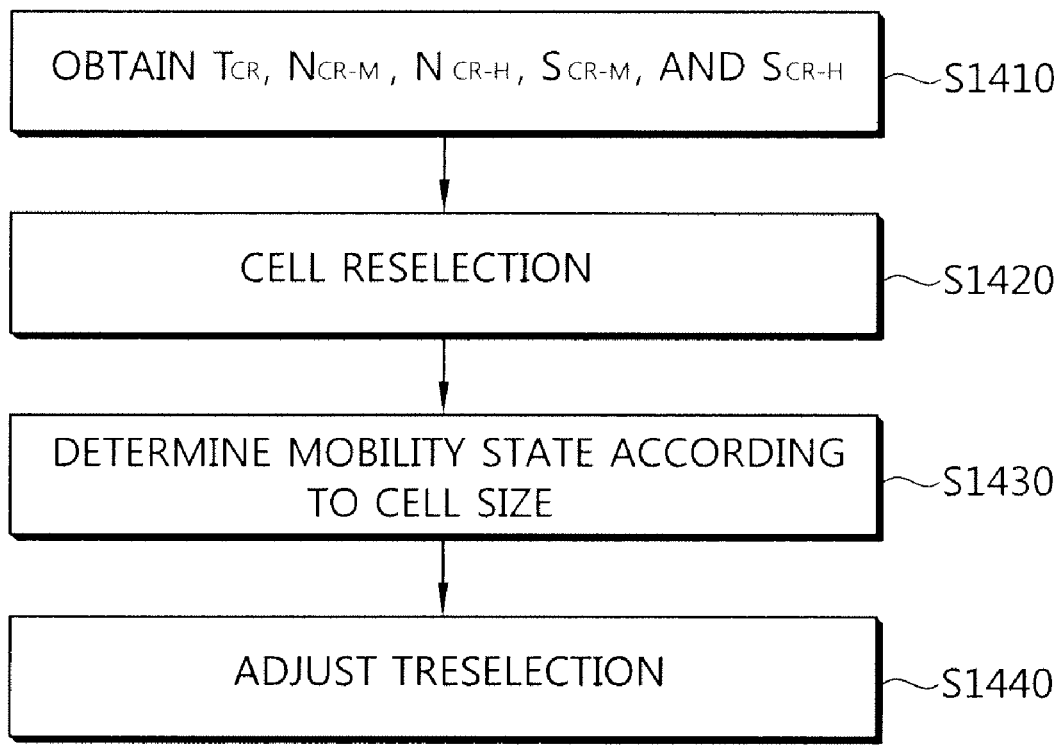
FIG. 14 is a flowchart illustrating a method of determining a mobility state according to an embodiment of the present invention.

FIG. 14 is a flowchart illustrating a method of determining a mobility state according to an embodiment of the present invention.

A UE obtains a mobility determination parameter and a reselection scaling parameter (step S1410). The mobility determination parameter includes a mobility period $T_{CR}$, a medium mobility threshold $N_{CR-M}$, and a high mobility threshold $N_{CR-H}$. The reselection scaling parameter includes a medium mobility scaling factor $S_{CR-M}$ and a high mobility scaling factor $S_{CR-H}$. Herein, $S_{CR-H} < S_{CR-M} < 1$.

The mobility determination parameter and/or the reselection scaling parameter can be reported by a BS to the UE through a part of system information, an RRC message, a MAC message or a PDCCH. The mobility determination parameter and the reselection scaling parameter can be transmitted through one parameter, or can be transmitted through separate messages.

The UE performs cell reselection (step S1420). When signal quality of a serving cell is less than a threshold, the UE measures signal quality of a neighboring cell. If the signal quality of the neighboring cell is greater than the threshold (and/or if the signal quality of the serving cell is less than the threshold and/or the signal quality of the neighboring cell is better than the signal quality of the serving cell), a reselection timer starts. If the signal quality of the neighboring cell is maintained during the Treselection, a corresponding cell is reselected.

The UE determines the mobility state according to a cell size (step S1430).

The UE adjusts the Treselection according to the determined mobility state (step S1440). When the UE changes from the normal mobility to the medium mobility, the Treselection is multiplied by the medium mobility scaling factor $S_{CR-M}$. When the UE changes to the high mobility, the Treselection is multiplied by the high mobility scaling factor $S_{CR-H}$.

The UE performs cell reselection by using the regulated Treselection.

Figure 15:
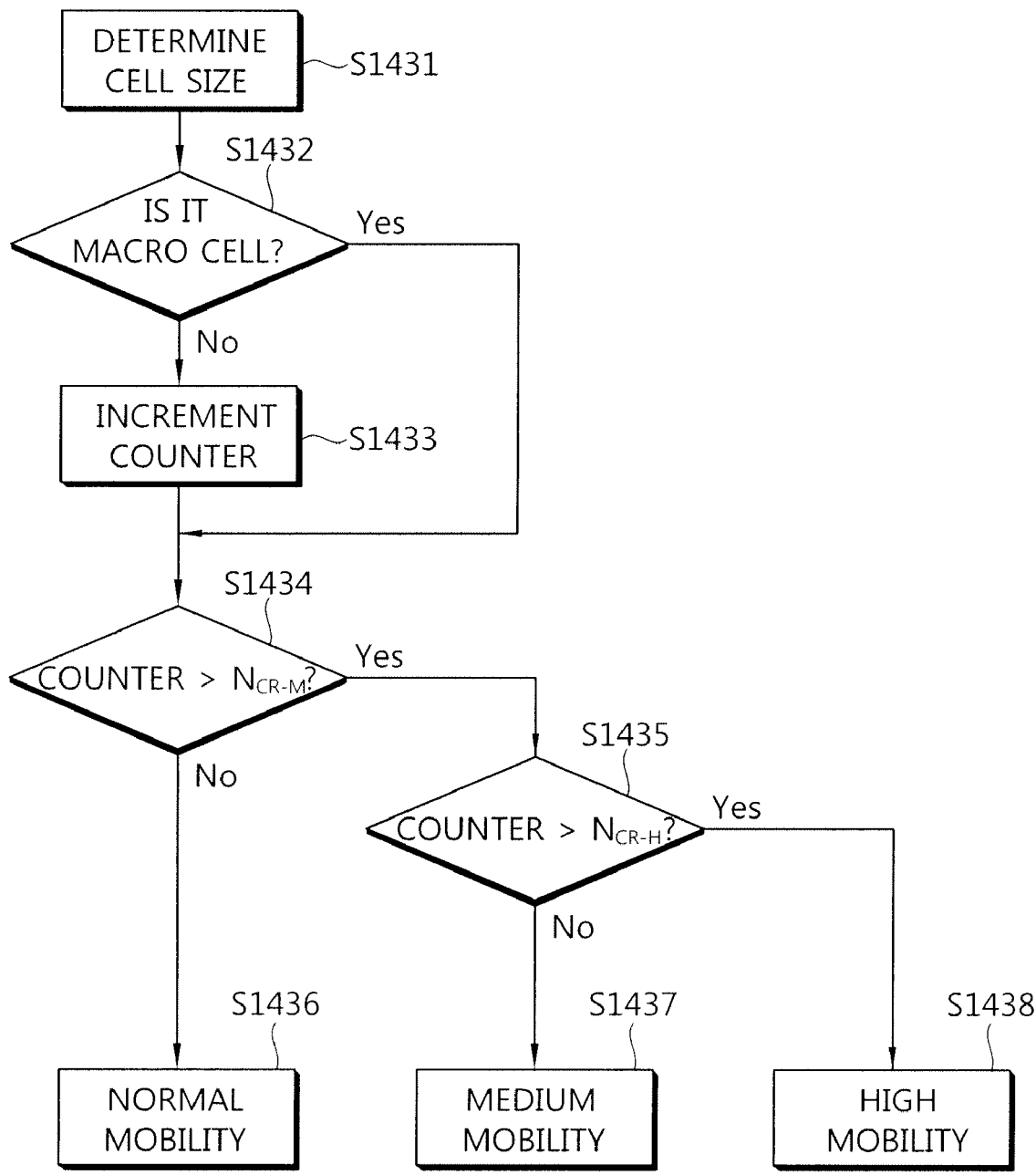
FIG. 15 is a flowchart illustrating a method of determining a mobility state according to a cell size.

FIG. 15 is a flowchart illustrating a method of determining a mobility state according to a cell size.

A UE determines a size of a reselected cell (step S1431). As described above, the UE can determine the cell size on the basis of at least one of PCI, a cell size indicator, a CSG indicator and previously stored information.

If the reselected cell is a macro cell (step S1432), a counter is not incremented. If the reselected cell is a micro cell, the counter is incremented (step S1433). This implies that a cell having a small cell size is not counted in the number of cell reselections.

The counter indicates the number of cell reselections. Whether there is a change in a mobility state of the UE is determined on the basis of a counter value.

It is determined whether the counter value is greater than $N_{CR-M}$ during a mobility period (step S1434). If the counter value is less than $N_{CR-M}$, the mobility state is determined to a normal mobility (step S1436).

If the counter value is greater than $N_{CR-M}$, it is determined whether the counter value is greater than $N_{CR-H}$ during the mobility period (step S1435).

If the counter value is less than $N_{CR-H}$, the mobility state is determined to a medium mobility (step S1437). If the counter value is greater than $N_{CR-H}$, the mobility state is determined to a high mobility (step S1438).

Even if a UE enters an area where a micro cell and a macro cell coexist, a mobility state of the UE can be correctly determined. Therefore, unnecessary cell reselection can be avoided.

The proposed method can be applied various procedures to support the mobility of the UE. For example, the UE may report a measurement result of a target cell to a source cell (i.e. a current serving cell) for handover. The UE may report the measurement result if the measurement result satisfies a reporting event during a triggering period. The proposed technique to adjust Treselection according to the cell size may be applied to adjust the triggering period for the handover according to the cell size.

Figure 16:
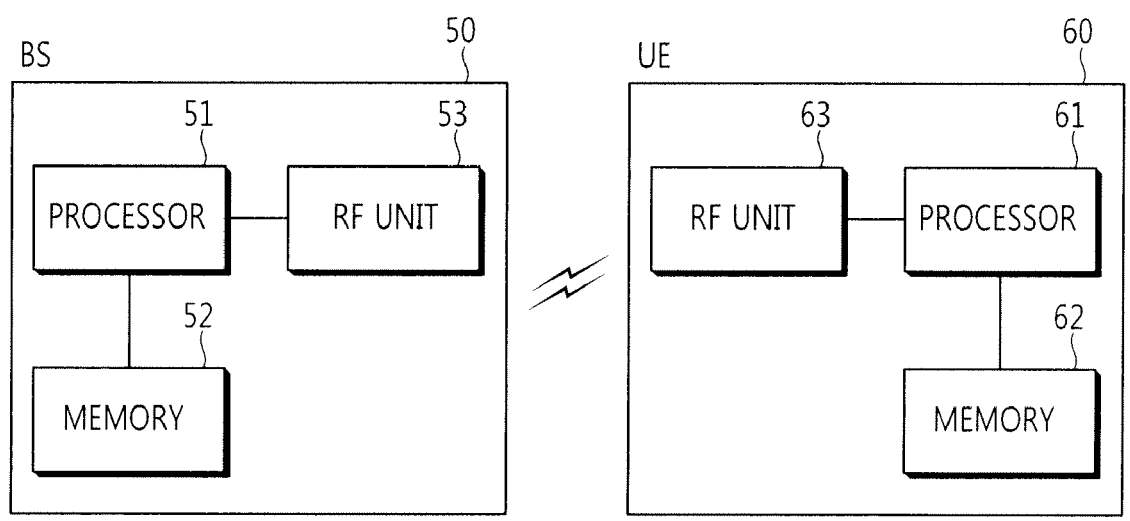
FIG. 16 is a block diagram showing a wireless communication system to implement an embodiment of the present invention.

FIG. 16 is a block diagram showing wireless communication system to implement an embodiment of the present invention.

A BS 50 may include a processor 51, a memory 52 and a radio frequency (RF) unit 53. The memory 52 is operatively coupled with the processor 51 and stores a variety of information to operate the processor 51. The RF unit 53 is operatively coupled with the processor 11, and transmits and/or receives a radio signal.

The processor 51 may be configured to implement proposed functions, procedures and/or methods described in this description. Layers of the radio interface protocol may be implemented in the processor 51. The processor 51 may implement operations of a BS in the embodiments in FIG. 11 and FIG. 14.

A UE 60 may include a processor 61, a memory 62 and a RF unit 63. The memory 62 is operatively coupled with the processor 61 and stores a variety of information to operate the processor 61. The RF unit 63 is operatively coupled with the processor 61, and transmits and/or receives a radio signal.

The processor 61 may be configured to implement proposed functions, procedures and/or methods described in this description. Layers of the radio interface protocol may be implemented in the processor 61. The processor 51 may implement operations of a UE in the embodiments in FIG. 11 and FIG. 14.

The processors 51, 61 may include application-specific integrated circuit (ASIC), other chipset, logic circuit and/or data processing device. The memories 52, 62 may include read-only memory (ROM), random access memory (RAM), flash memory, memory card, storage medium and/or other storage device. The RF units 53, 63 may include baseband circuitry to process radio frequency signals. When the embodiments are implemented in software, the techniques described herein can be implemented with modules (e.g., procedures, functions, and so on) that perform the functions described herein. The modules can be stored in memories 52, 62 and executed by processors 51, 61. The memories 52, 62 can be implemented within the processors 51, 61 or external to the processors 51, 61 in which case those can be communicatively coupled to the processors 51, 61 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of determining a mobility state of a user equipment in a wireless communication system, the method comprising:
    performing cell reselection;
    determining a size of a cell to be reselected;
    determining whether to increase a counter for indicating the number of cell reselections according to the cell size; and
    determining the mobility state on the basis of the number of cell reselections and a size of the cell,
    wherein the mobility state is one of a normal mobility, a medium mobility, and a high mobility, and
    wherein the determining of the mobility state comprises:
        determining the mobility state to the normal mobility if the number of cell reselections during a mobility period is less than a medium mobility threshold;
        determining the mobility state to the medium mobility if the number of cell reselections during the mobility period is between the medium mobility threshold and a high mobility threshold; and
        determining the mobility state to the high mobility if the number of cell reselections during the mobility period is greater than the high mobility threshold.

2. The method of claim 1, wherein, if the reselected cell is a micro cell, the counter is not incremented.

3. The method of claim 2, wherein the micro cell is a closed subscriber group (CSG) cell.

4. The method of claim 1, further comprising regulating a reselection time on the basis of the mobility state.

5. The method of claim 1, wherein the cell size is determined on the basis of a physical cell identity (PCI) of a measured cell.

6. The method of claim 4, wherein the cell size is determined on the basis of a cell size indicator.

7. The method of claim 4, wherein the cell size is determined on the basis of a CSG indicator.

8. A user equipment for determining a mobility state, comprising:
    a radio frequency (RF) unit for transmitting and receiving a radio signal; and
    a processor, coupled to the RF unit, for determining the mobility state,
    wherein the processor is configured to:
    perform cell reselection,
    determine a size of a cell to be reselected,
    determine whether to increase a counter for indicating the number of cell reselections according to the cell size, and
    determine the mobility state on the basis of the number of cell reselections and a size of the cell,
    wherein the mobility state is one of a normal mobility, a medium mobility, and a high mobility, and
    wherein the determining of the mobility state comprises:
        determining the mobility state to the normal mobility if the number of cell reselections during a mobility period is less than a medium mobility threshold,
        determining the mobility state to the medium mobility if the number of cell reselections during the mobility period is between the medium mobility threshold and a high mobility threshold, and
        determining the mobility state to the high mobility if the number of cell reselections during the mobility period is greater than the high mobility threshold.

9. The user equipment of claim 8, wherein, if the reselected cell is a micro cell, the processor is configured no to increment the counter.

* * * * *